US006732126B1

(12) United States Patent
Wang

(10) Patent No.: US 6,732,126 B1
(45) Date of Patent: May 4, 2004

(54) HIGH PERFORMANCE DATAPATH UNIT FOR BEHAVIORAL DATA TRANSMISSION AND RECEPTION

(75) Inventor: Hsinshih Wang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/307,072

(22) Filed: May 7, 1999

(51) Int. Cl.[7] ................................................. G06F 7/48
(52) U.S. Cl. ........................................ 708/232; 708/518
(58) Field of Search ................................. 708/232, 518

(56) References Cited

U.S. PATENT DOCUMENTS

| | | | | | |
|---|---|---|---|---|---|
| 4,580,215 A | * | 4/1986 | Morton | ...... | 708/232 |
| 4,833,635 A | * | 5/1989 | McCanny et al. | ...... | 708/518 |
| 4,870,302 A | * | 9/1989 | Freeman | ...... | 708/232 |
| 5,457,644 A | * | 10/1995 | McCollum | ...... | 708/232 |
| 5,530,661 A | * | 6/1996 | Garbe et al. | ...... | 708/518 |
| 5,805,477 A | * | 9/1998 | Perner | ...... | 708/232 |

* cited by examiner

*Primary Examiner*—David H. Malzahn
(74) *Attorney, Agent, or Firm*—Michael A. Proksch

(57) ABSTRACT

A programmable and configurable datapath unit (DPU) includes a configuration of single-bit multi-function processing units (PUs). The DPU can perform any of a variety of functions depending on the control applied to each PU. Functionality can be increased by utilizing multiplexers to direct data into, out of, and through each DPU dependent on the selected function being performed. Datapath units can also be configured and interconnected to form larger datapath circuits, arrays, and systems so as to increase the data throughput of the datapath system. A configurable and programmable datapath array includes rows of datapath units which can be interconnected to provide DPU circuits having varying input operand widths and functions. A datapath system can be constructed with a plurality of arrays of DPUs to further increase system data throughput.

31 Claims, 12 Drawing Sheets

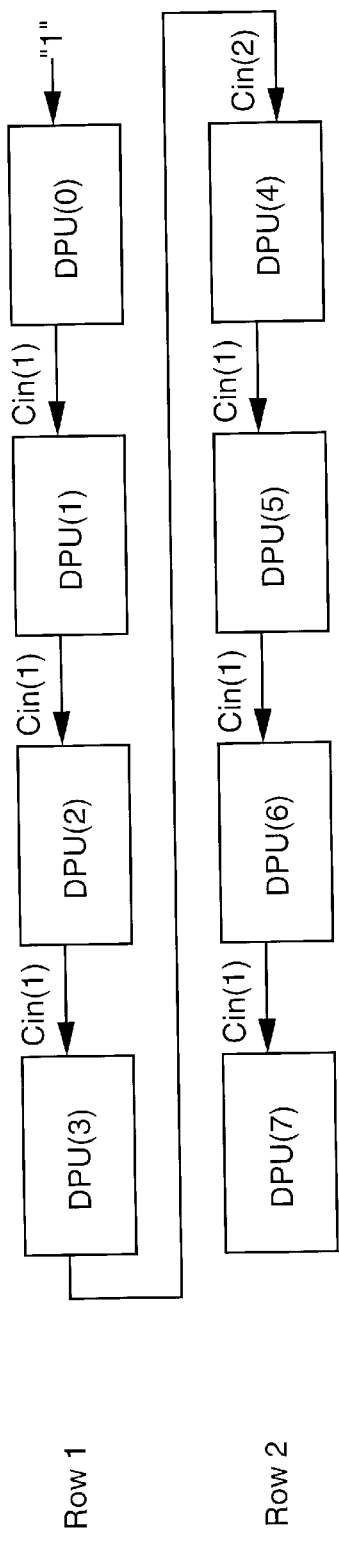
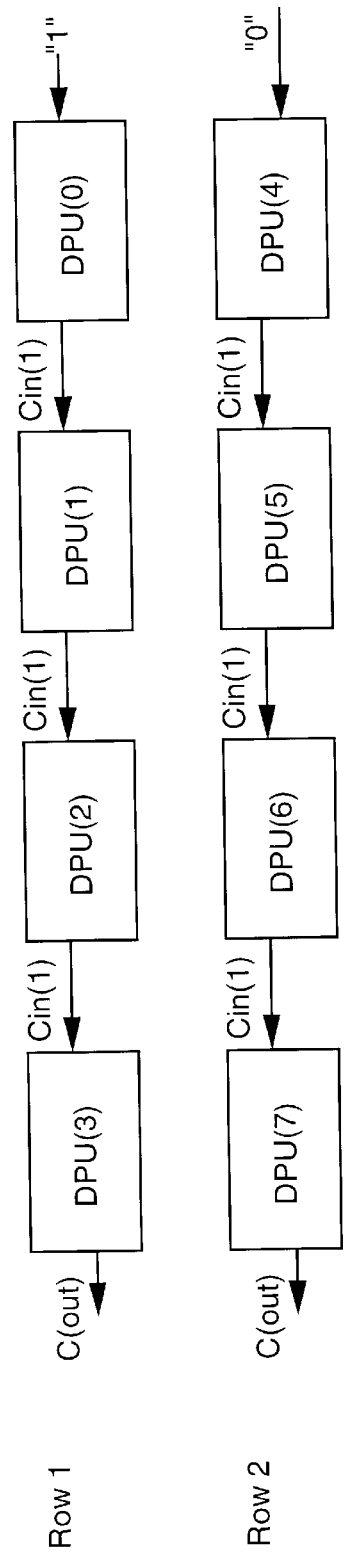
Figure 2D
Figure 2E

HIGH PERFORMANCE DATAPATH UNIT FOR BEHAVIORAL DATA TRANSMISSION AND RECEPTION

BACKGROUND OF THE INVENTION

1. Field of the Invention

The present invention relates to datapath circuits in computing systems.

2. State of the Art

Computing systems typically include a datapath for operating on data within the system. In general, the datapath of a computing system includes functional blocks (implemented in either software or hardware) each dedicated to performing a single function. FIG. 1 shows an example of a simplified datapath system having a typical set of functional blocks including an adder block, an incrementor block, logic function blocks (each performing a different logic function), a barrel shifter block. A common bus having a fixed width couples a dataword to the inputs of the functional blocks wherein only one of the outputs of functional blocks is multiplexed to the output of the datapath.

One problem with this design is that the datapath system is exclusively dedicated to the current operation it is performing such that only a single dataword can be operated on by a single functional block at one time thereby causing a bottleneck at the input of the datapath. In the field of communications in which high frequency real-time data is processed, a bottleneck at the input of the datapath represents a significant reduction in overall system performance. Alternatively, more functional blocks can be added, however, this represents an increase in design size.

In addition, since the common input bus is a fixed width, if a dataword having a width that is smaller than the common bus width is processed by the datapath only a portion of the common bus width is used and the remainder is wasted resulting in an inefficient utilization of bandwidth. Finally, in prior art systems the bus width into the datapath becomes the limit of your data throughput. For instance, if you have a 32-bit bus width into the datapath and it is desired to transfer 64-bits, it would be necessary to perform this in two transfer operations.

The present invention is a system and method of designing a configurable datapath which allows for a variable width datapath and which is programmable so as to perform a variety of data functions using the same datapath unit.

SUMMARY OF THE INVENTION

A programmable and configurable datapath unit (DPU) includes a configuration of N interconnected single-bit multi-function processing units (PUs) configured into at least a row of PUs. The PUs are controlled by the same control signal such that the datapath unit is programmable to perform a selected N-bit function dependent on the control signal. The DPU is configurable in that it can be interconnected with other DPUs to increase its data throughput. In one embodiment each PU is implemented as a modified adder, each having at least first and second single-bit inputs, a carry input, a control signal input, a carry output, and a sum output. In this embodiment, the adders are interconnected such that the carry output of a given PU in the configuration is coupled to the carry input of the adjacent PU in the configuration. Each of the adders are implemented with logic gates such that intermediate logic operation resultants can be obtained from each adder. The intermediate operation resultants are internally multiplexed to the sum output port of the adder along with the addition resultant. The control applied to the control input of each adder selects which resultant is internally multiplexed to the sum output port of each PU. Each PU can also include boolean logic circuitry for performing other logic functions which are multiplexed to its sum output port. In one embodiment, the DPU is controlled to perform any of the following functions including addition, subtraction, multiplexing, incrementing, standard and custom logic functions, and conditional operations. In another embodiment, multiplexers are used to direct input and output data through each PU dependent on the selected function being performed.

The DPU input operand width is dependent on the number of single-bit PUs in a given row. In accordance with a system and method of the present invention, more than one DPU can be interconnected and programmed to form a datapath circuit having a wider input/output bit operand. In one embodiment, each individual DPU has four single-bit PUs in a single row so that it can be combined with other similar DPUs to form 4(n)-bit datapath circuits.

In accordance with another system and method of the present invention, more than one DPU is configured into an array. Groups of DPUs are interconnected and programmed to form multiple datapath circuits. The datapath circuits, in turn, are interconnected to form a datapath system made-up of the multiple datapath circuits each capable of performing a different function and having a different input and output operand widths. In one embodiment, the array comprises eight DPUs in each row and the array includes 32 rows.

In another embodiment, the DPU is designed so that it can be configured to perform a multiplication function in addition to standard and customized logic functions, conditional functions, and arithmetic functions. The DPU includes an array of eight single-bit modified adders, having four adders in a top row and four adders in a bottom row so as to form four pairs of stacked adders. The DPU further includes sets of multiplexers for directing the dataflow through the configuration of adders dependent on the function being performed by the DPU. The DPU is adapted for stacking and interconnecting rows of DPUs to form an array of DPUs which performs a first step of the multiplication operation. Additional adder circuitry performs a second step of the multiplication operation. In one embodiment a portion of a 16×16 bit multiplication circuit is formed by stacking and interconnecting 4 rows of DPUs, each row including 4 DPUs.

BRIEF DESCRIPTION OF THE DRAWINGS

The present invention may be further understood from the following written description in conjunction with the appended drawings. In the drawings:

FIGS. 2D–2F show different configurations of interconnecting and programming rows of DPUs in an array of DPUs according to the present invention.

DETAILED DESCRIPTION OF THE PREFERRED EMBODIMENTS

Figure 1:
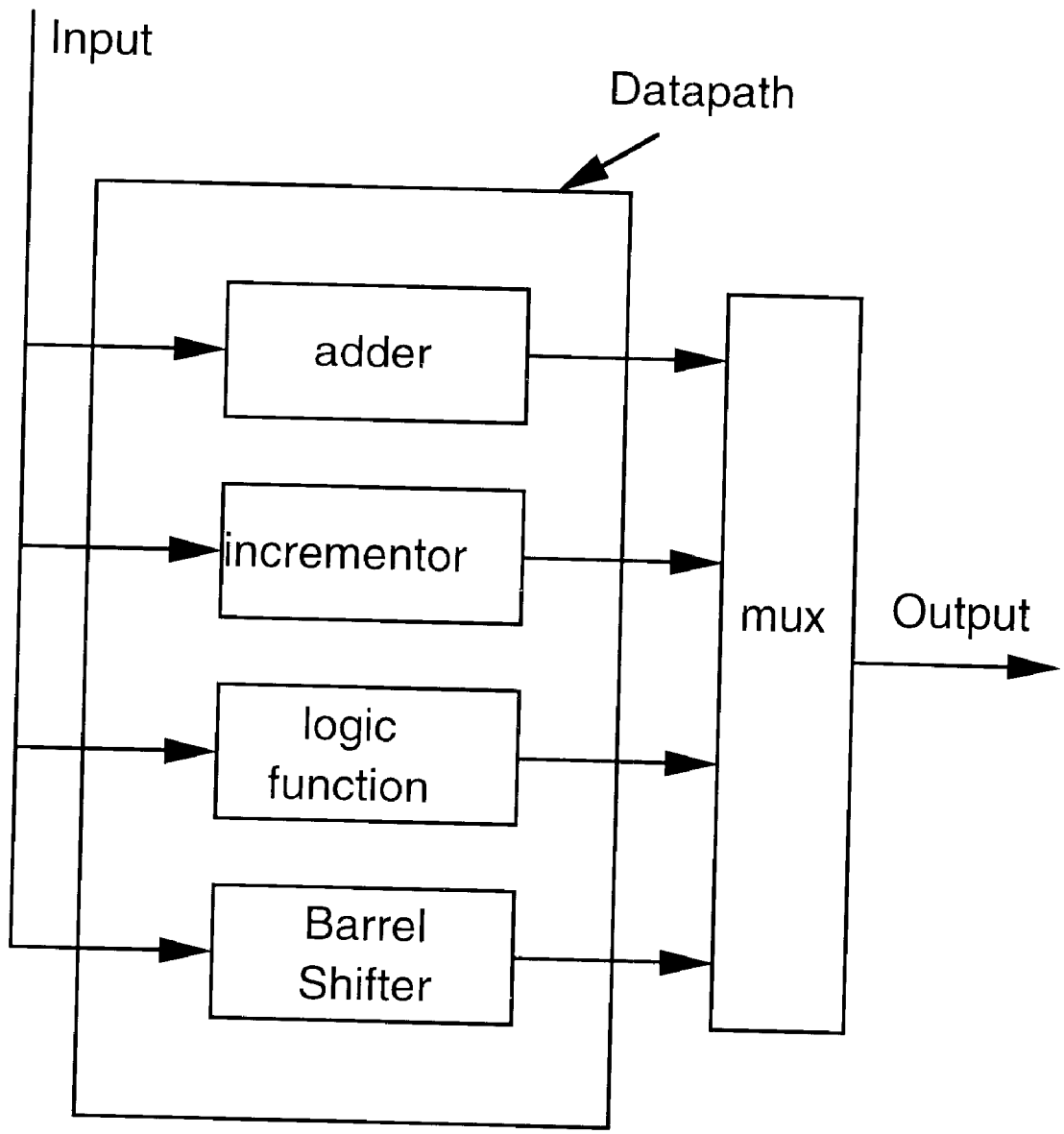
FIG. 1 is a prior art datapath system.
Figure 2A:
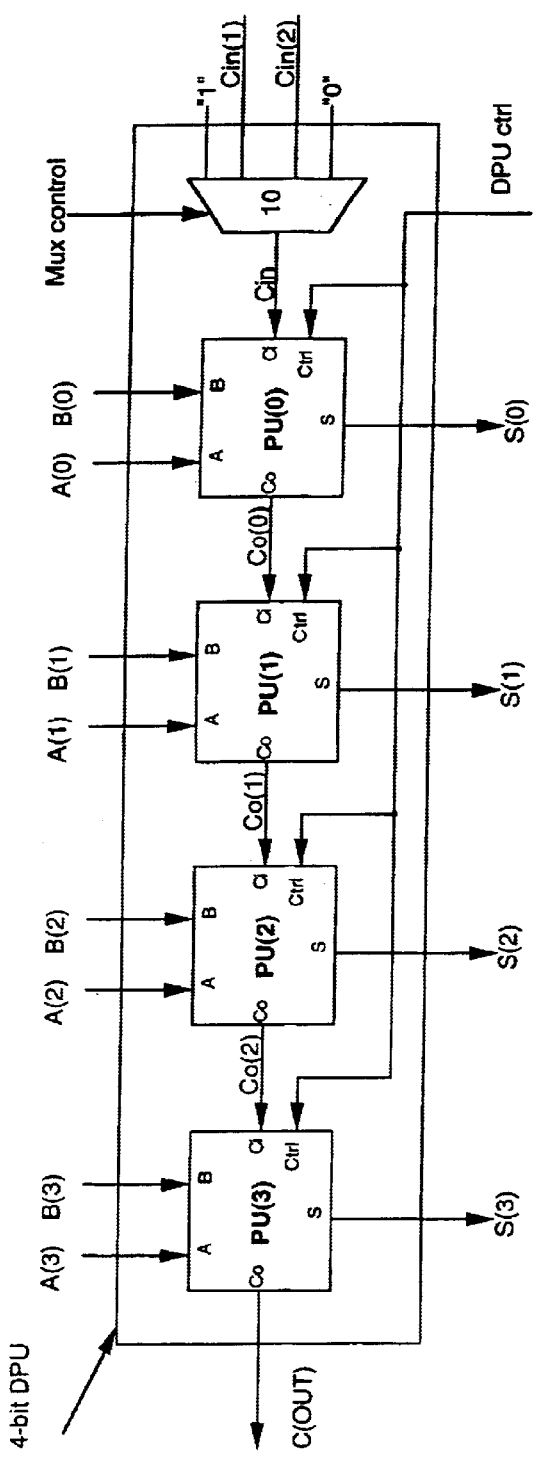
FIG. 2A is one embodiment of a datapath unit (DPU) in accordance with the present invention.

A first embodiment of the datapath unit (DPU) is shown in FIG. 2A which includes N=4 multi-function processing units (PUs) each having two single bit inputs $A(n)$ and $B(n)$ (n=0–3), a carry-in input ($C_i(n)$), a control input Ctrl, a carry-out output ($C_o(n)$), and a sum output ($S(n)$).

The same control signal, DPU ctrl, applied to each PU which programs the DPU to perform a given function. In one embodiment, the control signal is derived from an opcode in a computing system. The DPU, dependent on the DPU ctrl signal, performs a selected operation on all or some of the input operands A, B, and Cin and outputs a resultant value to both or one of the S and Co outputs.

Specifically, in response to the DPU ctrl signal, each PU performs the same single bit function on their single bit input A, B, and Cin operands. For instance, if DPU ctrl signal corresponds to an AND logic operation, the following simultaneous operations are performed on 4-bit A and B operands:

PU(0): A(0) AND B(0)=S(0);
PU(1): A(1) AND B(1)=S(1);
PU(2): A(2) AND B(2)=S(2);
PU(3): A(3) AND B(3)=S(3).

It should be noted that the Cin and C(out) values are not used when performing the above simple logic functions, as well as all other operations not involving addition, subtraction, incrementing, and decrementing. As a result, multiplexer 10, as well as its inputs (i.e., "1", Cin(1), Cin(2), and "0") are unused during these operations.

In the case in which the DPU ctrl signal corresponds to an operation involving addition, subtraction, incrementing, and decrementing, a Cin value is provided by multiplexer 10 and a C(o) value is generated by each of PU(0)–PU(3) of the 4-bit DPU. As shown in FIG. 2A, the Cin value can be set to several values via multiplexer 10 (i.e., "1", "0", Cin(1) and Cin(2)). When Cin is set to Cin(1), Cin is provided from the C(out) of an adjacent previous DPU in the same row or is provided by the computing system as a carryin operand. When Cin is set to Cin(2), Cin is provided from another DPU within the system which is not in the same row of DPUs. A mux control signal determines which value is coupled to the Cin of the DPU.

Hence, in the case in which the DPU shown in FIG. 2A is controlled to perform, for example, an addition operation between 4-bit A and B operands in which Cin(1) is selected by multiplexer 10, the following simultaneous operations are performed:

PU(0): A(0)+B(0)+Cin(1) to generate S(0) and Co(0)
PU(1): A(1)+B(1)+Co to generate S(1) and Co(1)
PU(2): A(2)+B(2)+Co(1) to generate S(2) and Co(2)
PU(3): A(3)+B(3)+Co(2) to generate S(3) and C(out)

Figure 2B:
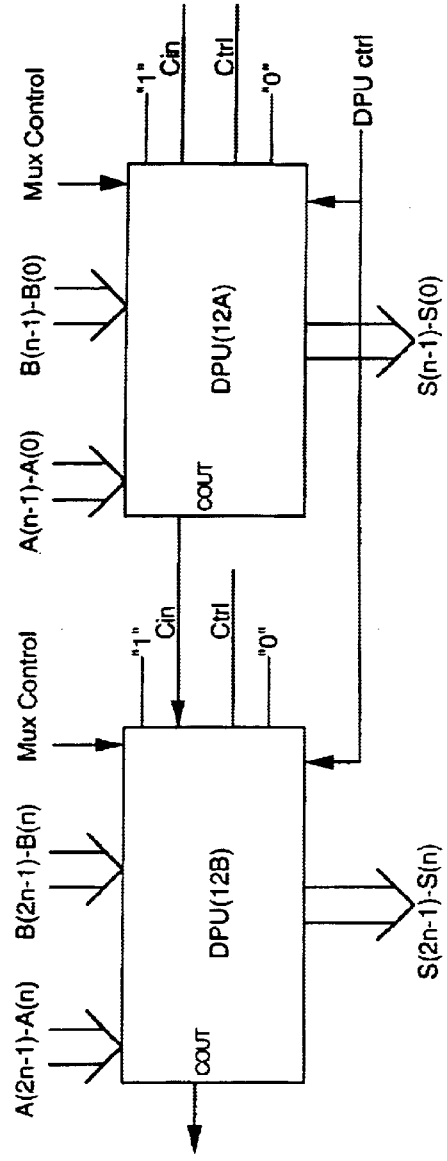
FIG. 2B is one embodiment of a datapath circuit in which two DPUs are connected.

In accordance with another embodiment of the present invention, groups of DPUs are configured together to form a datapath circuit having a greater datapath input operand than the single DPU shown in FIG. 2A. FIG. 2B shows two DPUs interconnected into a single row to form a single datapath circuit having twice the input operand width of the single DPU. For instance, DPU(12A) is coupled to the first n bits of each of the A and B operands (i.e., (bit(0)–bit(n−1)) and DPU (12B) is coupled to the last n bits of the A and B operands (i.e., (bit(n) to bit (2n−1)). In this embodiment, in operations involving addition, subtraction, incrementing and decrementing, a Cin value is selected for DPU(12A) from inputs "1", "0", Cin(1), Cin(2), and the Cin value selected for DPU (12B) is Cin(1) coupled from the Cout of DPU (12A). When the DPU is programmed to perform operations not involving addition, subtraction, incrementing, and decrementing, the carry values are not used, carry outputs are not connected between DPUs, and each DPU operates on its corresponding n-bits of the operands to generate S(0)–S (2n−1). In addition, each DPU is programmed to perform the same function with the same DPU ctrl signal.

Figure 2C:
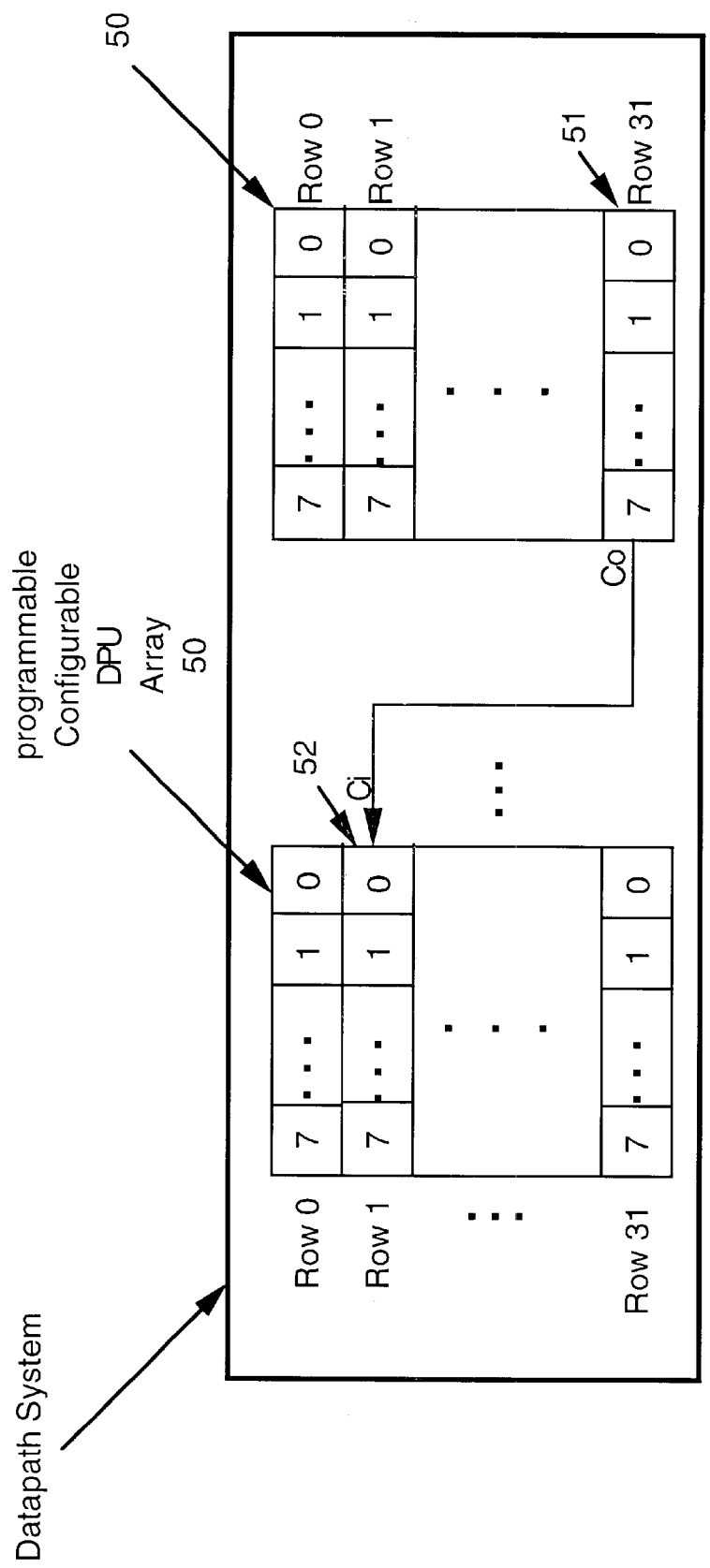
FIG. 2C shows a datapath system implemented with a plurality of configureable and programmable arrays of datapath units.

FIG. 2C shows an embodiment of a datapath system implemented with a plurality of configureable and programmable arrays of DPUs 50. Each array 50 includes 32 rows (Row 0–Row 31) of DPUs, each row of DPUs includes eight individual 4-bit DPU(0)–DPU(7). Input and output data are multiplexed into and out of the array of DPUs depending on how the DPUs are interconnected and programmed and DPUs can be interconnected to form DPU circuits having varying input operand widths. For instance, for smaller input operands of 8-bits, two DPUs can be interconnected and programmed to perform an 8-bit operation. Alternatively, all of the DPUs in a given row can potentially be interconnected and programmed to perform a 32-bit operation (i.e., 8 4-bit DPUs per row). Also shown in FIG. 2C is the interconnection of DPUs between each array 50 to further increase data throughput. For example, a first row 51 and a second row 52 can be interconnected and programmed so as to perform operations greater than 32-bits (i.e., one row of DPUs) by routing the carryout bit (Co) of row 51 to the carryin bit (Ci) of row 52, thereby providing an extremely flexible datapath system.

Figure 2F:
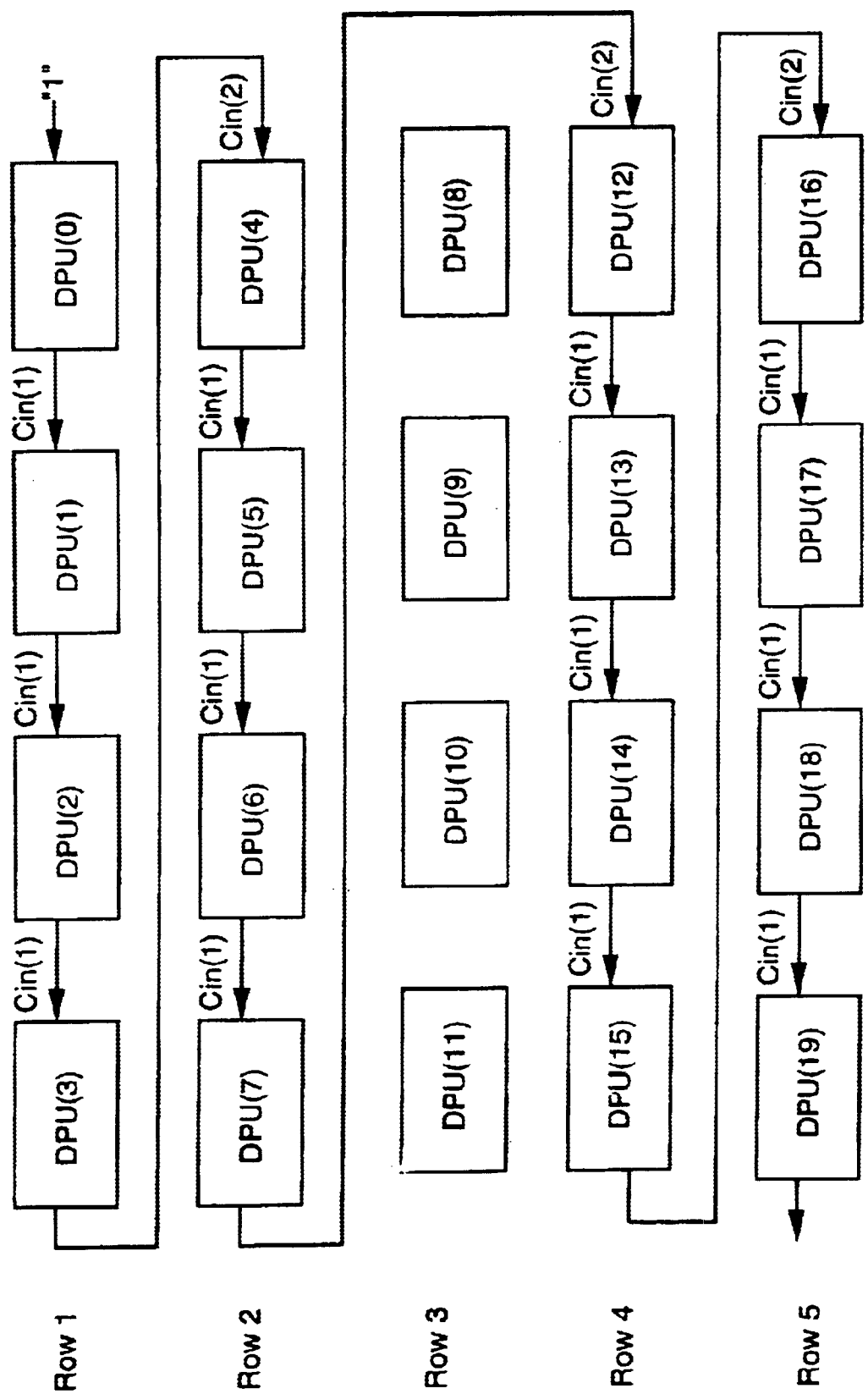

FIGS. 2D–2F show different manners in which rows in an array 50 of DPUs can be interconnected and programmed according to the present invention. In should be noted that although FIGS. 2D–2F illustrate four DPUs per row instead of eight as shown in FIG. 2C, the concepts of interconnecting and programming more than four DPUs are the same no matter how many DPUs per row. It should be also noted that no control or operand signals are shown in FIGS. 2D–2F.

FIG. 2D shows a Row 1 including DPU(0)–DPU(3) and a Row 2 including DPU(4)–DPU(7) interconnected together to form a DPU circuit which can perform a 32-bit additive or subtractive operation (i.e., addition, subtraction, incrementation, or decrementation) with a carryin bit Cin= "1". As described above with respect to FIG. 2B, the carryin bits passed between DPUs in the same row are coupled to the Cin(1) input of each DPU and the carryout bit passed from DPU(3) in Row 1 is routed and coupled to the Cin(2) input of DPU(4) in Row 2.

FIG. 2E shows two successive rows, a Row 1 including DPU(0)–DPU(3) and a Row 2 including DPU(4)–DPU(7), which are interconnected and programmed to perform two independent 16-bit additive or subtractive operations. As shown, Row 1 has a Cin="1" carryin operand and Row 2 has a Cin="1" carryin operand. In addition, each of the DPUs pass carryout bits to adjacent DPUs on the Cin(1) input port.

FIG. 2F shows five successive rows, a Row 1 including DPU(0)–DPU(3), a Row 2 including DPU(4)–DPU(7), a Row 3 including DPU(8)–DPU(11), a Row 4 including DPU(12)–DPU(15), and a Row 5 including DPU(16)–DPU(19) which are interconnected and programmed to perform a 64-bit additive or subtractive operation and a 16-bit operation which is not additive or subtractive. As shown, it is not necessary to interconnect successive rows in a given array. Specifically, the Row 2 carryout value is routed to the Cin(2) input of Row 4. In addition, it should be noted that carryin and carryout bits are not interconnected in Row 3 since DPU(8)–DPU(11) are programmed to perform an operation which does not utilize carry bits (e.g., AND function) and hence it is not necessary to pass carry bits to perform these types of functions. Alternatively, the carryin and carryout connections can be present between DPU(8)–DPU(11) and in a "don't care" condition.

Figure 2G:
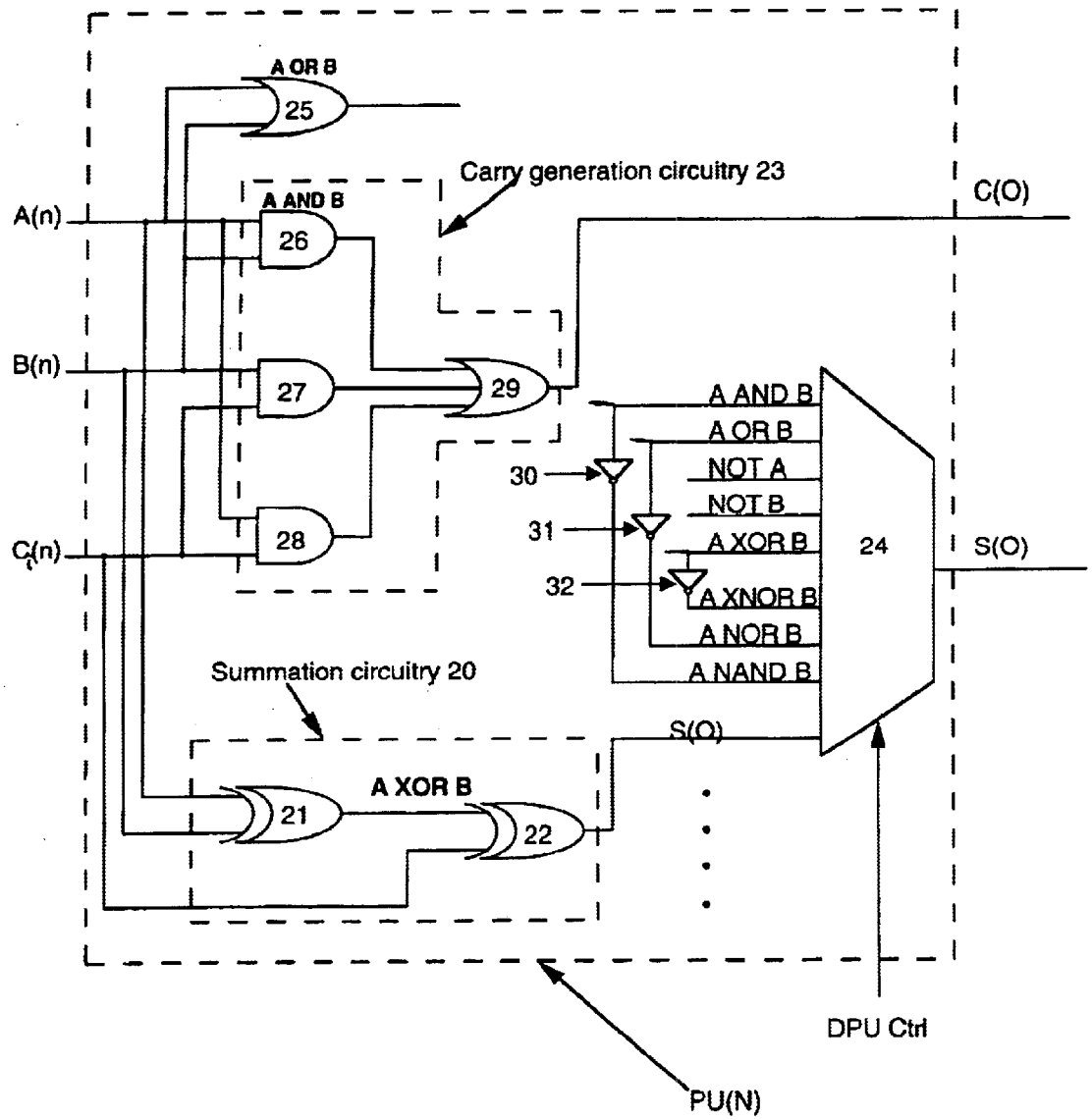
FIG. 2G is one embodiment of a single-bit processing unit (PU) embodied as a modified adder.

FIG. 2G shows one embodiment of a PU(n) which can perform a plurality of operations in accordance with the present invention. The PUs are implemented as modified adders having three single bit inputs A(n), B(n) and carry-in input, $C_i$(n). The summation circuitry 20 including XOR gates 21 and 22 generates a summation resultant S(O) of A(n) and B(n) which is coupled to one of the inputs of the multiplexer 24. The carry generation circuitry 23 including logic gates 26–29 generates a carry-out value C(O) of the PU. In addition to S(O) and C(O), the PU also generates many intermediate logic, arithmetic, and conditional values and resultants thereby allowing the PU to perform a variety of different operations. For instance, the A AND B and A XOR B logic operation resultants can be extracted from the summation circuitry and carry generation circuitry from gates 26, and 21, respectively, and coupled to one of the inputs of multiplexer 24. Additional logic gate 25 is added to obtain the A OR B logic function which is also coupled to an input of multiplexer 24. Additional inverting gates 30–32 are added to the PU to negate the AND, OR, and XOR functions to generate NAND, NOR, and XNOR functions also coupled to the inputs of multiplexer 22. Dependent on the DPU ctrl signal (which corresponds to the DPU ctrl signal shown in FIG. 2A) the desired operation resultant coupled to the input of multiplexer 24 is passed to its output S(O). Hence, a datapath unit as shown in FIG. 2A implemented with processing units as shown in FIG. 2G can perform the following logic functions AND, NAND, NOR, OR, XOR, XNOR, as well as the mathematical addition functions. It should be understood that in accordance with the present invention, additional operations or functions not mentioned can be obtained through intermediate resultants within the processing unit or through the addition of logic circuitry, the resultants of which are then also coupled to the input of multiplexer 24.

The PU shown in FIGS. 2A and 2G can perform the following functions as shown below. In some cases additional circuitry is necessary as will be described herein and shown in FIGS. 3A–3D.

1) Name ADD
   Opcode 0x00 0000000
   Pseudocode result=A+B
   Description A plus B, where Cin is set to 0

2) Name ADDC
   Opcode 0x10 0010000
   Pseudocode result=A+B+Cin(1)
   Description A plus B where Cin is provided as an input from the system or provided from an previous DPU 3) Name ADDCNT
   Opcode 0x18 0011000
   Pseudocode result = A+B+Cin(2)
   Description A plus B where Cin=Cin(2) is configurably provided from the datapath system 4) Name SUB
   Opcode 0x09 0001001
   Pseudocode result = A−B=A+/B+1 (1's complement)
   Description A minus B, select /B, and set Cin=1

5) Name SUBC
   Opcode 0x11 0010001
   Pseudocode result = A−B+Cin=A+/B+Cin (1's complement)
   Description A minus B, select/B, and set Cin=Cin(1)

6) Name SUBCNT
   Opcode 0x19
   Pseudocode result = A−B+Cin(2)=A+/B+Cin(2) (1's complement)
   Description A minus B, select /B, and set Cin=Cin(2)

7) Name SADD
   Opcode 0x20 0100000
   Pseudocode if(overflow)
       result = max
     else if(underflow)
       result = min
     else
       result = A+B
   Description A plus B with saturation, Cin=0

8) Name SADDC
   Opcode 0x30 0110000
   Pseudocode if(overflow)
       result = max
     else if(underflow)
       result = min
     else
       result = A+B+Cin
   Description A plus B and saturation, Cin=Cin(1)

9) Name SADDCNT
   Opcode 0x38 0111000
   Pseudocode if(overflow)
       result = max
     else if(underflow)
       result = min
     else
       result = A+B+Cin(2)
   Description A plus B and saturation, Cin=Cin(2)

10) Name SSUB
    Opcode 0x29 0101001
    Pseudocode if(overflow)
        result = max
      else if(underflow)
        result = min
      else
        result = A−B
    Description A minus B with saturation, Cin=0

11) Name SSUBC
    Opcode 0x31 0110001
    Pseudocode if(overflow)
        result = max
      else if(underflow)
        result = min
      else
        result = A−B+Cin(1)
    Description A minus B with saturation, Cin=Cin(1)

12) Name SSUBCNT
    Opcode 0x39 0111001
    Pseudocode if(overflow)
        result = max
      else if(undeflow)
        result = min
      else
        result = A−B+Cin(2)
    Description A minus B with saturation, Cin=Cin(2)

-continued

```
13) Name       INC
    Opcode     0x0a              0001010
    Pseudocode result = B+1
    Description Increment B, Cin=1, A=0
14) Name       INCC
    Opcode     0x12              0010010
    Pseudocode result = B+Cin(1)
    Description Increment B, Cin=Cin(1), A=0
15) Name       DEC
    Opcode     0x04              0000100
    Pseudocode result = B-1=B+A+0
    Description Decrement B, Cin=0, A=1
16) Name       DECC
    Opcode     0x14              0010100
    Pseudocode result = B-1=B+A+Cin(1)
    Description Decrement B, Cin=Cin(1), A=1
17) Name       NEG
    Opcode     0x0b              0001011
    Pseudocode result = ~B+1
    Description Invert B and add 1, Cin=1
18) Name       NEGC
    Opcode     0x13              0010011
    Pseudocode result = ~B+Cin(1)
    Description Invert B and add Cin=Cin(1)
19) Name       ABS
    Opcode     0x4b              1001011
    Pseudocode if(B negative)
                  result = ~B+1
               else
                  result = B
    Description Absolute value of B, Negate B and add Cin=1,
                then check highest order bit of Sumout to see if
                neg. or pos.
20) Name       ABSC
    Opcode     0x53              1010011
    Pseudocode if(B negative)
                  result = ~B+Cin(1)
               else
                  result = B
    Description Absolute value of B, Negate B and add Cin=Cin(1),
                then check highest order bit of Sumout to see
                if neg. or pos.
21) Name       CSUB
    Opcode     0x49              1001001
    Pseudocode if(A-B > 0)
                  result = A-B
               else
                  result = B
    Description Conditional subtraction, A minus B, Cin=0,
                then check highest order bit of Sumout to see if
                neg. or pos. to select result
22) Name       CSUBC
    Opcode     0x51              1010001
    Pseudocode if(A-B > 0)
                  result = A-B+Cin(1)
               else
                  result = B
    Description Conditional subtraction, A minus B, Cin=Cin(1),
                then check highest order bit of Sumout to see if
                neg. or pos. to select result
23) Name       AND
    Opcode     0x61              1100001
    Pseudocode result = A&B
    Description Bitwise AND
24) Name       OR
    Opcode     0x63              1100011
    Pseudocode result = A|B
    Description Bitwise OR
25) Name       NAND
    Opcode     0x60              1100000
    Pseudocode result = ~(A&B)
    Description Bitwise NAND
26) Name       NOR
    Opcode     0x62              1100010
    Pseudocode result = ~(A|B)
    Description Bitwise NOR
27) Name       XOR
    Opcode     0x65              1100101
    Pseudocode result = A^B
    Description Bitwise XOR
28) Name       XNOR
    Opcode     0x64              1100100
    Pseudocode result = ~(A^B)
    Description Bitwise XNOR
29) Name       PASSA
    Opcode     0x67              1100111
    Pseudocode result = A
    Description Pass A
30) Name       PASSB
    Opcode     0x6f              1101111
    Pseudocode result = B
    Description Pass B
31) Name       NOTA
    Opcode     0x66              1100110
    Pseudocode result = ~A
    Description Invert A
32) Name       NOTB
    Opcode     0x6e              1101110
    Pseudocode result = ~B
    Description Invert B
33) Name       MIN
    Opcode     0x0f              0001111
    Pseudocode if (A<B)
                  result = A
               else
                  result = B
    Description Return smaller of A and B, conditional subtraction,
                A minus B, Cin=0, then check highest order bit of
                Sumout to see if neg. or pos. and select A or B
34) Name       MAX
    Opcode     0x2f              0101111
    Pseudocode if(A>B)
                  result = A
               else
                  result = B
    Description Return larger of A and B, conditional subtraction,
                A minus B, Cin=0, then check highest order bit of
                Sumout to see if neg. or pos. and select A or B
```

Explanation of Operations

Figure 3A:
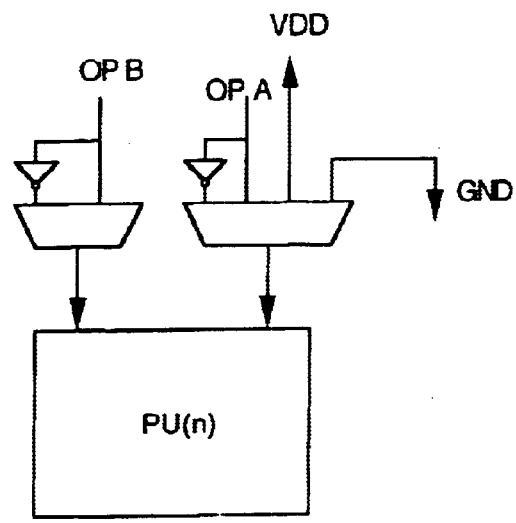
FIG. 3A shows one embodiment of the selective application of the operands to the PUs of the present invention.

The SUB operation is equivalent to performing the corresponding 1's complement addition operation A+invB+1. In this case, Cin is set to 1 and the input B operand is inverted before being applied to the DPU. In one embodiment, the inversion of the B operand is performed external to the DPU where the B operand and the inverse of the B operand is applied to the input of a multiplexer and is selectively coupled to the input of each PU as shown in FIG. 3A. The SUBC and SUBCNT operations are performed similar to the SUB operation however, instead of setting Cin=1, Cin is either set to Cin(1) or Cin(2).

The saturated addition operation, SADD, is performed by adding the A and B operands and then checking the results to see if the adder is saturated (i.e., in an overflow/underflow condition). In the case of an overflow, the result is set back to the maximum value and in the case of an underflow condition, the result is set to the minimum value. To implement this operation, the DPU performs the A+B operation and the two most significant bits of the sumout output of the DPU or a row of DPUs are used to select either a MAX value, a MIN value, or the A+B value from the Sumout output of each PU. In particular, if the two most significant bits of the sumout value are equal to "0" then an overflow condition has occurred and the MAX value is selected. If the two most significant bits of the sumout value are equal to "1" then an underflow condition has occurred and the MIN value is selected. Otherwise, the A+B value is selected. In one embodiment, the selection is performed using a multiplexer. The SADDC and SADDCNT operations are performed in the same manner as the SADD operation except that Cin is set as indicated.

The saturated substraction operations, SSUB, SSUBC, and SSUBCNT, are implemented by performing a subtraction operation as described for the SUB, SUBC, and SUBCNT operations followed by a saturation check at the end of the operation as described for the saturated addition operations, to select either a MAX, a MIN, or a A–B value.

The increment operation, INC, is performed by applying the value to be incremented to the B input and setting the A operand=0 and Cin=1. INCC is performed in a similar manner except the Cin value is set to Cin(1) in the case in which adjacent DPUs are connected and the carryout from a previous DPU is coupled to the Cin of the subsequent DPU. In this case the Cin of the first DPU in the row is coupled to "1" and the remainder of the DPUs in the row have Cin coupled to the Cout of the previous DPU in the row.

The DEC operation is performed by setting Cin=0 and A=1 which results in a 1's complement subtraction of B–A. The DECC operation is performed by setting Cin=Cin(1) and A=1 which results in a 1's complement subtraction of B–A+Cin(1).

The NEG operation is performed by setting Cin=1, selecting the negated B operand and adding invB+Cin. The NEGC operation is similarly performed except Cin=Cin(1).

Figure 3B:
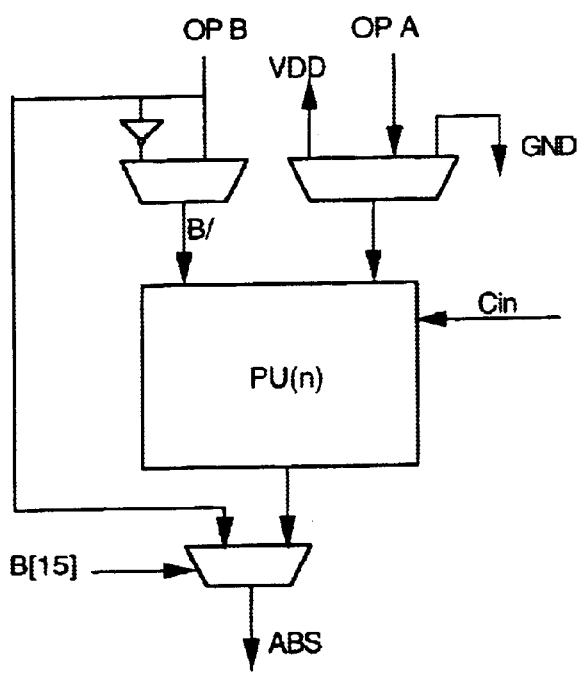
FIG. 3B shows a PU circuit implementation for performing a absolute value operation (ABS)

The ABS operation is performed by setting Cin=1, selecting the negated B operand, adding invB+Cin, and then selecting either the sumout output of the DPU or the B operand using a multiplexer dependent on whether the highest order bit of the B operand is positive (B[15]=0) or negative (B[15]=1). FIG. 3B shows one embodiment of a PU circuit implementation utilized to perform the ABS operation. The ABSC operation is performed similarly by setting Cin=Cin(1).

Figure 3C:
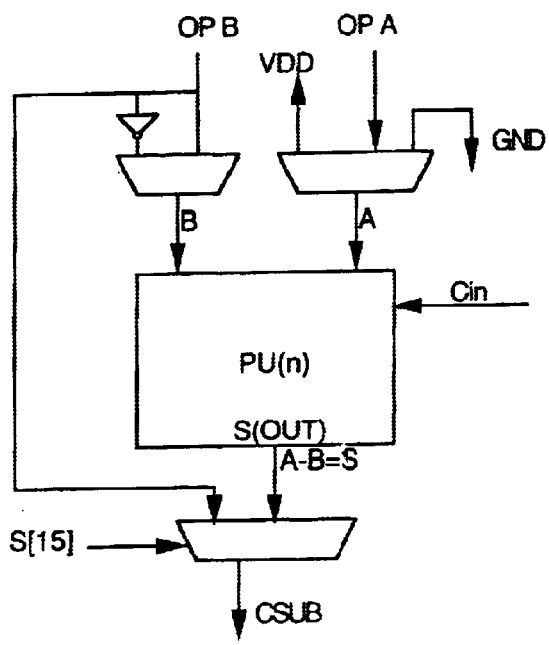
FIG. 3C shows a PU circuit implementation for performing a conditional subtraction (CSUB)

The conditional subtraction (CSUB) is implemented by performing a subtraction operation (SUB) and then determining if the sumout highest order bit is positive or negative. If the sumout is positive, the sumout result is selected and if sumout is negative, the B operand is selected. FIG. 3C shows one embodiment of a PU circuit implementation utilized to perform the CSUB operation. The CSUBC operation is performed similarly by setting Cin=Cin(1).

The logical operations AND, OR, NAND, NOR, XOR, and XNOR are obtained from within each PU and are multiplexed to the output of the PU using the control signal to select which operation resultant is passed to the S(O) of each PU in the DPU.

The PASSA and PASSB operations which pass either the A or B operands through the DPU can be implemented is several manners. For instance, an addition operation can be performed where the A operand is added to a B operand that is set to "0" or visa versa. Alternatively, the A and B operands can be coupled directly to the multiplexer 24 of the PU (FIG. 2D) and selectively passed to the S(O) of the PU.

Figure 3D:
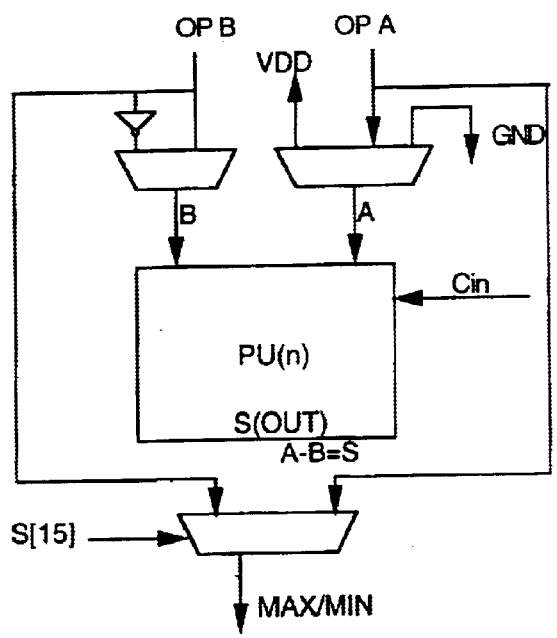
FIG. 3D shows a PU circuit implementation for performing a MAX or MIN operation.

The MIN and MAX operations are implemented by performing a conditional SUB and using the higher order bit of the sumout to select either A or B depending on whether a MAX or MIN operation is being performed. FIG. 3D shows one embodiment of a PU circuit implementation utilized to perform the MIN and MAX operations and depending on which operation is performed (MAX or MIN) the most positive or negative operand is chosen by S[15].

Hence, in accordance with the embodiments shown in FIGS. 2A, 2B, and 2G and 3A–3D the above operations can be performed.

Figure 4:
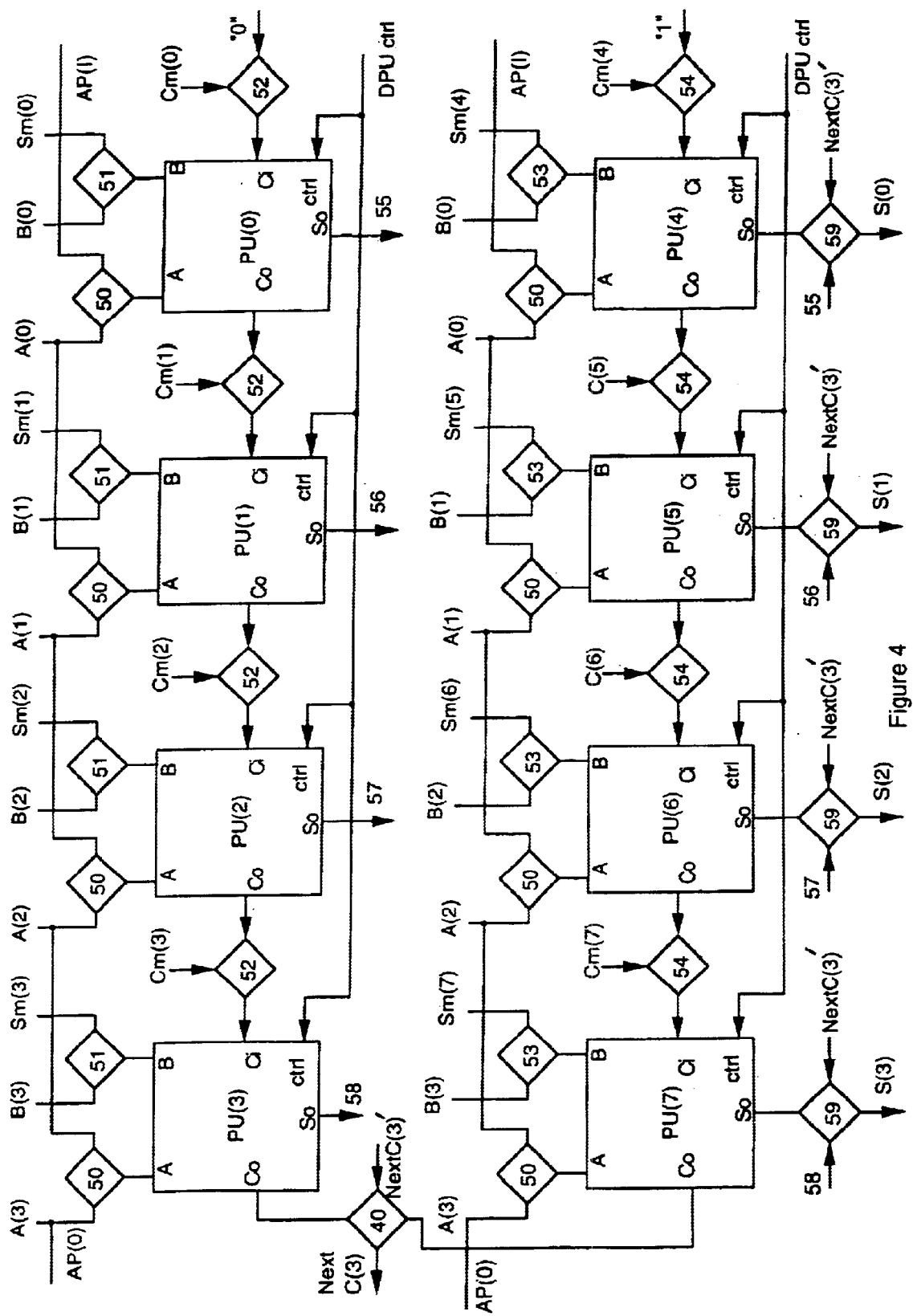
FIG. 4 shows a second embodiment of the DPU of the present invention adapted to perform a multiplication operation.

FIG. 4 shows an embodiment of a DPU which can perform all of the functions as described above and which is also adapted to perform a multiplication operation thereby providing an even more functionally powerful datapath unit. The datapath unit (DPU) shown in FIG. 4 has a configuration of logical modified adders including a top row of four 1-bit modified adders, PU(0)–PU(3), and a bottom row of four 1-bit modified adders, PU(4)–PU(7). Each PU has four single bit inputs and two single bit outputs—a first operand input A, a second operand input B, a carryin input Ci, a control input ctrl, a sumout output So and a carryout output Co.

The DPU includes input data ports A(0)–A(3) and B(0)–B(3) for receiving corresponding input operand signals. Each PU is controlled by a DPU ctrl signal coupled to its ctrl input port. The DPU ctrl signal controls all of the PUs in FIG. 4 to perform the same function on the input operands.

The PUs are arranged so as to form four stacks of PU pairs, including stacks PU(0)/PU(4), PU(1)/PU(5), PU(2)/PU(6), and PU(3)/PU(7) each stack generating a single bit sumout output signal on DPU ports S(0)–S(3). The carryout signal for coupling to a next adjacent DPU is generated on port NextC(3).

The DPU also includes an input port AP(I) for receiving a single A operand bit from a previous DPU in order to implement a single-bit shift operation. The AP(I) port provides a means of multiplying the A operand by 2 by shifting it to the left by one bit location. This operation (i.e., multiply by 2) is useful when using the DPU to perform a Booth's Algorithm multiplication as will be described herein.

The DPU also includes a plurality of multiplexers that direct data into, through, and out of the configuration of modified adders dependent on select control signals (not shown) coupled to the plurality of multiplexers. In particular, when the DPU is used to form a multiplication unit, the multiplexers are set into a particular setting to direct data within the DPU in a manner as required to perform the multiplication operation. Alternatively, when the DPU is controlled to perform other operations such as operations 1–34 as described above, the multiplexers are set into different settings to direct data within the DPU in an alternate manner. The multiplication operation is performed using both top and bottom rows of PUs. Operations involving addition, subtraction, incrementation and decrementation use either the top or bottom row depending on the carry value NextC(3)' value from the previous DPU. In general, the remainder of the operations use the top row DPUs and bypass the bottom row of PUs.

A first set of eight multiplexers 50 each determines which single bit A operand is coupled to the input of its corresponding PU. Each multiplexer 50 has one of its inputs coupled to its corresponding single bit A operand, A(n), the other of its inputs coupled to the single bit A operand of the adjacent PU, A(n–1), and its output coupled to the A input port of its corresponding PU. For instance, multiplexer 50 corresponding to PU(1) has a first input coupled to the A(1) signal, a second input coupled to the A(0) signal, and has its output coupled to the A input port of PU(1). In the case of the first and last PUs (i.e., PU(0) and PU(3)), the AP(I) input signal provides the single bit A operand from the previous DPU. Allowing the selection of the A operand in this manner allows for single-bit shift operations and for the multiplication of the A operand by 2 prior to coupling the A operand to it corresponding A input port.

The DPU further includes a second set of four multiplexers 59, each corresponding to one pair of stacked PUs and each determining if the sum output is taken from the top PU or the bottom PU in the stack. For instance, multiplexer 59 corresponding to the PU(0)/PU(4) stack has one input coupled to the So signal (signal 55) generated by PU(0) and its other input coupled to the So signal generated by PU(4) and determines if S(0) is taken from either PU(0) or PU(4). The multiplexers 59 are controlled by the previous DPU's carryout bit NextC(3)'.

The DPU also includes a third set of four multiplexers 52 and a fourth set of four multiplexers 54, each corresponding to one of the eight PUs for selectively directing carryin bits into the carryin input (Ci) of each of the PUs. Each of the multiplexers 52 and 54 has a first input coupled to the carryout (Co) bit from the previous (PU(n−1)) in the same row and has a second input coupled to a carry bit Cm(n). The Cm(n) is a carry bit that is used when performing a multiplication operation and will be described herein below. Each of the multiplexers 52 are coupled to the same control signal (not shown) and each of the multiplexers 54 are coupled to the same control signal (not shown) such that each of the top and bottom row PUs receive their carryin bits in the same manner.

The DPU also includes a 2-to-1 multiplexer 40 having its inputs coupled to the carry outputs (Co) from the top and bottom left most PUs (i.e., PU(3) and PU(7)) and having its control input coupled to the NextC(3)' control signal from the previous adjacent DPU. Multiplexer 40 is used to determine whether the top or bottom row of PUs provides the NextC(3) carry out signal to the next DPU.

The DPU further includes multiplexer 51 and 53, which direct data into the B operand input of the top and bottom rows of PUs, respectively. Specifically, multiplexers 51 and 53 couple either the single bit B(n) operand to the B input port of each PU(n) for most operations or a single bit sum output Sm(n) from an upper row PU when performing a multiplication operation.

In one embodiment, the PUs in the DPU shown in FIG. 4 are implemented as shown in FIGS. 2B, 2G and 3A–D and hence can perform a plurality of operations as described for the embodiment of the DPU shown in FIG. 2A. These operations are implemented by applying multiplexer control input signals to direct data through the DPU and by applying the DPU control signal to each PU to perform a selected operation.

Logical Operations

To perform a bitwise logic operation, such as an A bitwise AND B operation, the DPU shown in FIG. 4 is set in the following manner:
1) multiplexers 50 are set to pass A(n) to the A input port of each PU(n);
2) multiplexers 51 and 53 are set to pass B(n) to the B input port of each PU(n);
3) the DPU ctrl signal is set to control each PU(n) to perform a single bit AND operation on each pair of single bits A(n) and B(n) coupled to each PU(n);
4) multiplexers 59 are set to select the So(n) from the top PU(n) in each stack of PUs.
5) the remainder of the inputs, PUs, and multiplexers are in a "don't care" condition.

In the case in which each PU is implemented as shown in the embodiment of FIG. 2G, the AND operation is performed by the DPU ctrl signal controlling multiplexer 24 to pass the A AND B input to the S(O) output of each PU, such that each PU performs a single bit AND operation on its corresponding single bit A(n) and B(n) operands. The Ci(n) and C(O) are in "don't care" conditions.

Operations Involving Addition, Subtraction, Incrementation, or Decrementation

To perform an operation involving addition, subtraction, incrementing, and decrementing which utilizes carry values, the DPU is set in the following manner:
1) multiplexers 50 are set to pass A(n) to the A input port of each PU(n);
2) multiplexers 51 and 53 are set to pass B(n) to the B input port of each PU(n);
3) multiplexers 52 and 54 are set such that:
   a) PU(n) receives its carryin value from the previous PU(n−1) for PU(1)–PU(3);
   b) PU(0) receives a carryin value of "0"; and
   c) PU(4) receives a carryin value of "1";
4) the DPU ctrl signal is set to control each PU(n) to perform a single bit addition operation on each pair of single bits A(n) and B(n) coupled to each PU(n) such that each of the top and bottom rows of PUs generate a 4-bit sumout value and a single bit carryout value from PU(3) and PU(7), respectively;
5) multiplexers 59 are set to select the 4-bit sumout value from either of the top or bottom row of PUs dependent on the previous NextC(3)' control signal provided from a previous DPU stage or system control as follows:
   a) if the carryin signal is to be "0" (i.e., Cin="0", FIG. 4) then the NextC(3)' control is set to pass the 4-bit sumout value from the top PU(n) in each stack of PUs;
   b) if the carryin signal is to be "1" (i.e., Cin="1", FIG. 4) then the NextC(3)' control is set to pass the sumout value from the bottom PU(n) in each stack of PUs;
6) multiplexer 40 is set to select Co from either PU(3) or PU(7) dependent on the NextC(3)' control signal.

Hence, for operations involving addition, subtraction, incrementation, or decrementation, a 4-bit addition is performed on the A and B operands by each of the top and bottom rows of PUs to generate a 4-bit top sumout value and a 4-bit bottom sumout value as well as a single bit top carry out value from PU(3) and a single bit bottom carry out value from PU(7). The NextC(3)' control signal then selects which sumout and carryout (top or bottom) is passed from the output ports S(0)–S(3) and NEXTC3 of the DPU. In the case in which each PU is implemented as shown in the embodiment of FIG. 2G, an additive or subtractive operation is performed by the DPU ctrl signal controlling multiplexer 24 to pass the S(O) to the S(O) output of each PU, such that each PU performs a single bit addition operation on its corresponding single bit A(n), B(n), and Ci(n) operands. The C(O) value is then coupled to the next adjacent PU in the DPU. It should be noted that as described above, subtractive operations are performed using 2s complement addition operations and adding a carryin bit of "1".

It should also be noted that in the case in which the DPU is the first in a row of DPUs (e.g., DPU(12A) in FIG. 2B) the NextC(3)' control signal is determined by multiplexer 10 as shown in FIG. 2A and consequently can be one of "1", Cin(1), Cin(2), or "0". Alternatively, if the DPU is a subsequent DPU in the row of DPUs (e.g., DPU(12B) in FIG. 2B) the NextC(3)' control signal is coupled to the Cin(1).

Multiplication Operation (A×B)

Figure 5A:
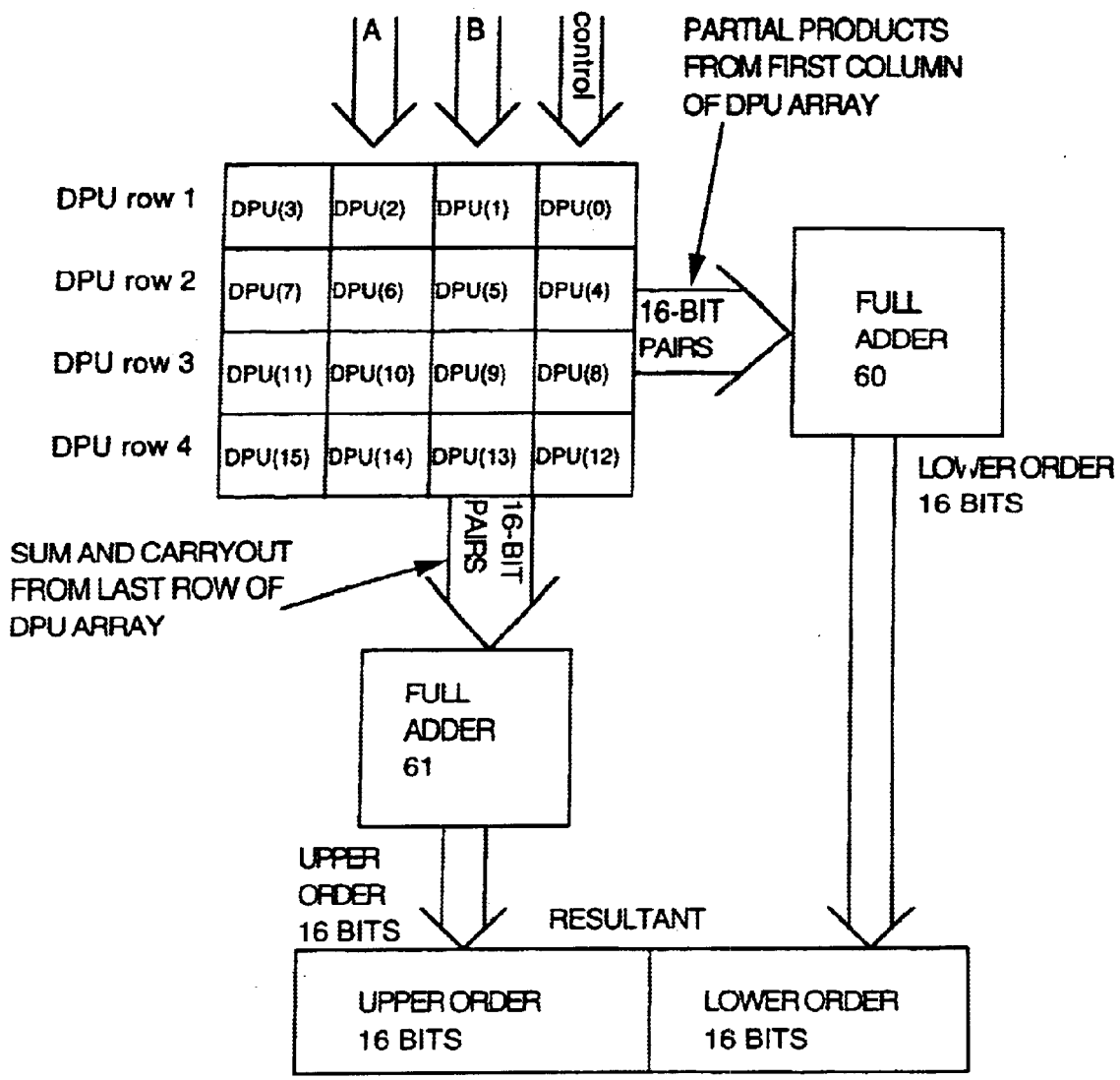
FIG. 5A shows a 16×16 bit multiplier implemented with a 4×4 array of DPUs.

In accordance with the embodiment of the DPU shown in FIG. 4, a group of DPUs can be interconnected into stacked rows of DPUs to form a first portion of a multiplier. The second portion of the multiplier is formed by first and second adder stages to generate the final multiplication product. FIG. 5A shows an embodiment of a 16×16 bit multiplier having a first portion implemented with an array of 16 DPUs (DPU(0)–DPU(15)) and having a second portion including a first full adder 60 for adding partial products generated by the array of 4×4 DPUs and including a second full adder 61 for adding sumout and carryout bits from the last row of DPUs in the array. To perform a multiplication operation a group of DPUs are interconnected into stacked rows of DPUs as will be described herein below.

The multiplication operation performed by the multiplier shown in FIG. 5A is based on the Booth's algorithm multiplication technique and consequently in accordance with this technique, certain input operands and carry bits are shifted before being coupled to the DPU input ports and to individual PUs within each DPU. Alternatively, some operands are set to "0" or "1" values. Since each DPU includes two rows of four single bit PUs as shown in FIG. 4, each row of four DPUs includes a top and bottom row of 16 PUs. For instance, row 1 including DPU(0)–DPU(3) has a top row of 16 PUs and a bottom row of 16 PUs and row 2 including DPU(4)–DPU(7) has a top row of 16 PUs and a bottom row of 16 PUs.

Figure 5B:
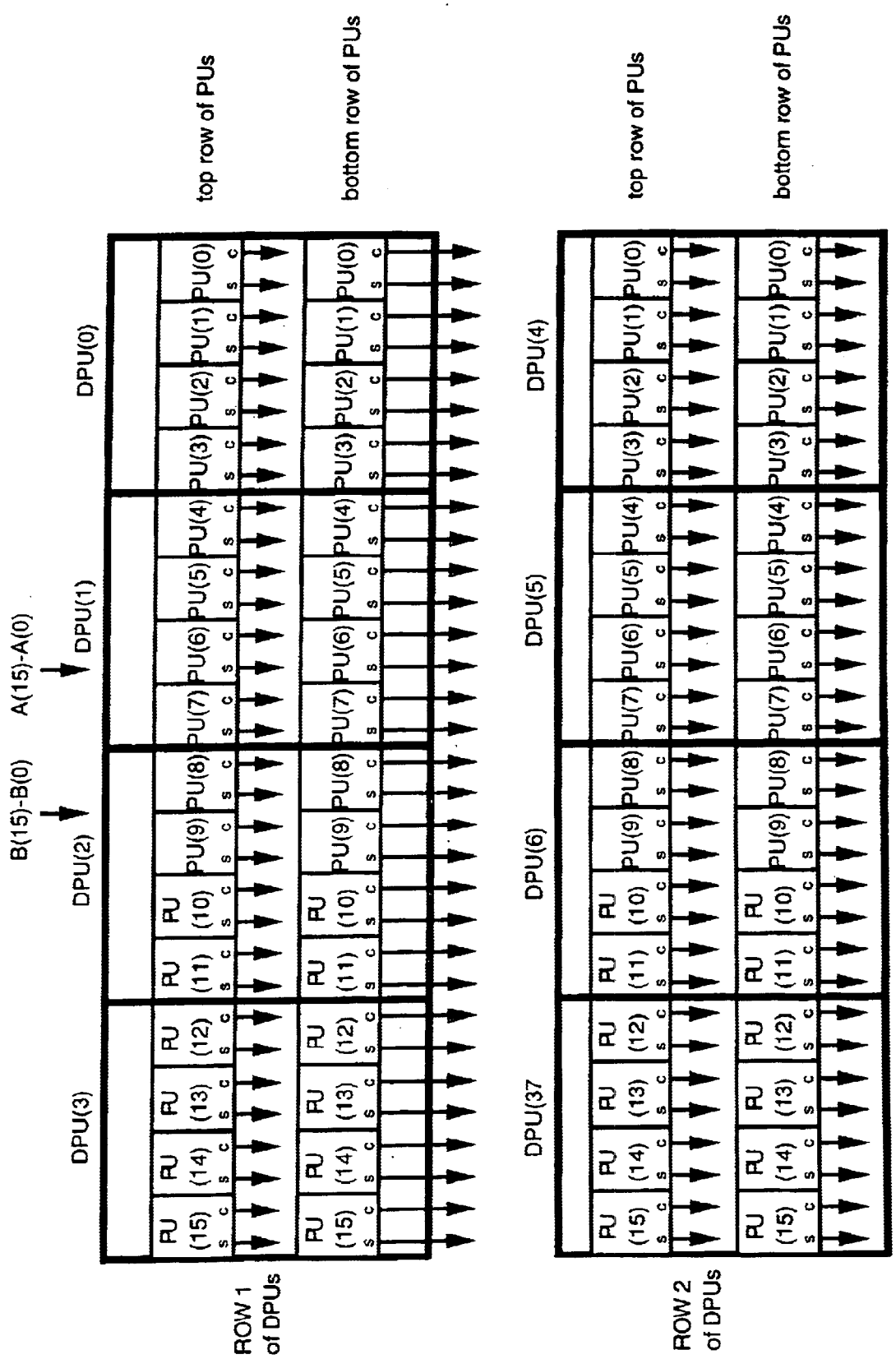
FIG. 5B shows a block diagram of two rows of DPUs and their associated PUs in the 4×4 array of DPUs shown in FIG. 5A.

FIG. 5B shows a detailed block diagram of DPU row 1 and DPU row 2 shown in FIG. 5A. (It should be noted that the multiplexers 50–54, and 59 (FIG. 4) are not shown in FIG. 5B so as to simplify the diagram.) The top row of 16 PUs in row 1 of the DPUs receives a 16-bit input A operand, A(0)–A(15), and a 16-bit B operand, B(0)–B(15). Each pair of single bit A and B operands are coupled to each of the A and B input ports of each of the top row of PUs. For instance, A(0) and B(0) are coupled to the A and B input ports of the PU(0) in the top row of the row 1 DPUs. Similarly, A(1) and B(1) are coupled to the A and B input ports of the PU(1) in the top row of the row 1 DPUs. The A input ports of the remainder of the PUs in each column are coupled to the same single bit A operand. For instance, all of the A input ports in the column of PU(0)s are coupled to A(0), all of the A input ports in the column of PU(1)s are coupled to A(1), etc.

Each row of 16 PUs performs a 16 bit addition operation and generates a 16-bit sumout value and a 16-bit carryout value which is coupled to the next row of PUs. For instance, referring to FIG. 5B, the top row of 16 PUs in row 1 of the DPUs generates a 16-bit sumout value and a 16-bit carryout value which is then coupled to the bottom row of 16 PUs in row 1 of the DPUs. The bottom row of 16 PUs in turn generates a 16-bit sumout value and a 16-bit carryout value which is then coupled to the top row of 16 PUs in row 2 of the DPUs.

Sumout and carryout values from each PU are coupled to the next row of PUs to facilitate the Booth's algorithm multiplication technique wherein sum and carry values are shifted from one row of PUs to the next. The shifting of values is achieved using multiplexers 51, 52, 53, and 54 (FIG. 4) for selecting and coupling shifted sumout values from previous rows to the B input port of each PU and for selecting and coupling shifted carryout values from previous rows to the Ci input port of each PU.

Figure 5C:
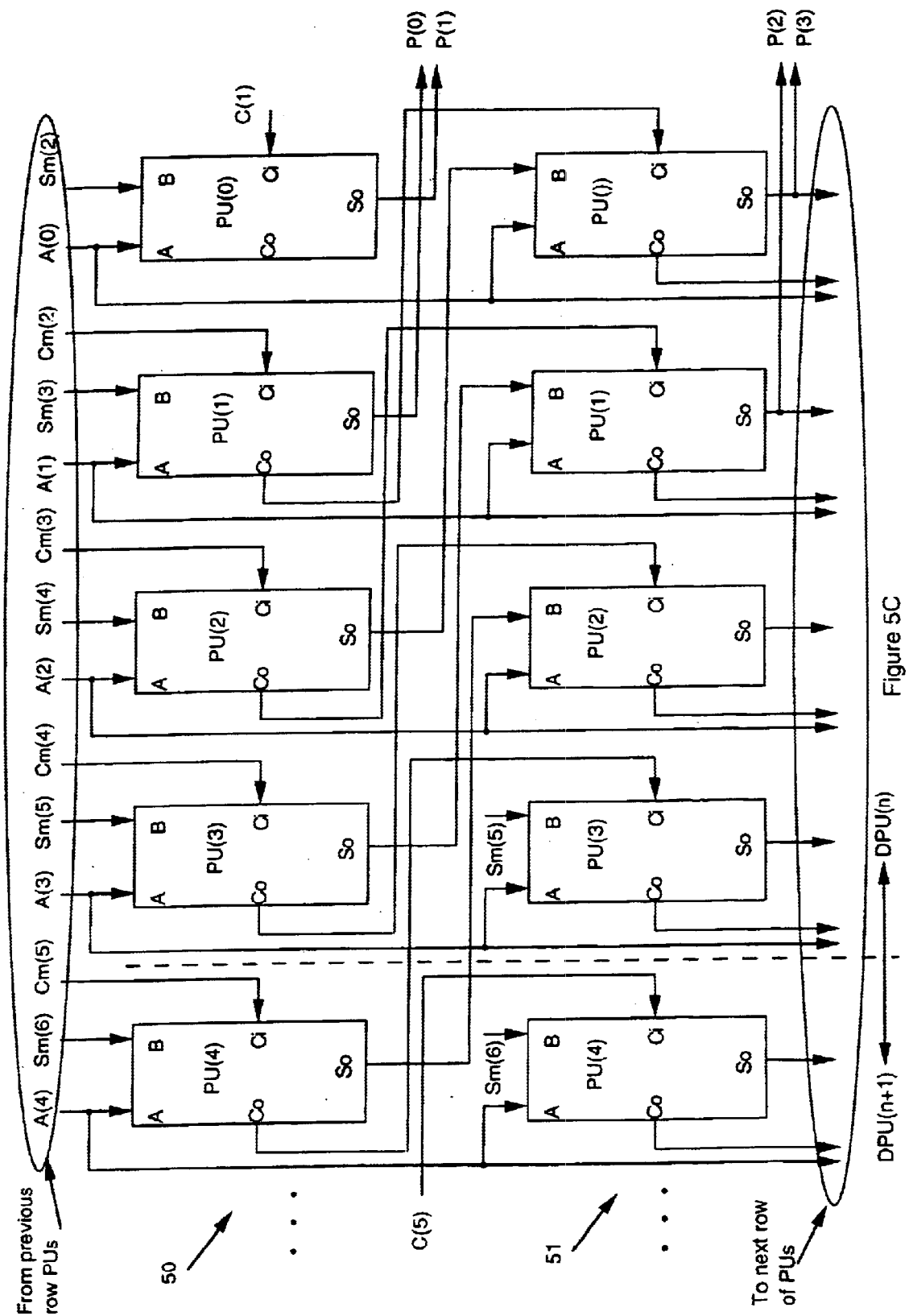
FIG. 5C shows interconnections of the sumout values and carryout values between rows of PUs in the 4×4 array of DPUs shown in FIG. 5A.

FIG. 5C shows the shifted interconnections of the sumout values and carryout values generated by a row of PUs 50 and coupled to a next row of PUs 51. For clarification, multiplexers are not shown and instead the resulting multiplexed interconnections are only illustrated. However, it should be understood that these interconnections are facilitated by the multiplexers shown in FIG. 4.

As can be seen in FIG. 5C, the single bit A(n) input operand is coupled to the A input port of the column of PU(n). For instance A(0) is coupled to the A input port of each PU(0) in rows 50 and 51. The B input port of each PU(n) in row 51 is coupled to the sumout value from the PU(n+2) in row 50. For instance, the sumout value from PU(2) in row 50 is coupled to the B input port of PU(0) in row 51, the B input port of PU(1) in row 50 is coupled to the sumout value Sm(3) from PU(3) in the row above row 50 (not shown).

The carryin input port ($C_i$) of each PU(n) in row 51 is coupled to the carryout value from the PU(n+1) in row 50. For instance, the carryout value from PU(1) in row 50 is coupled to the Ci input port of PU(0) in row 51 and the carryout value C(3) from a PU(3) above row 50 (not shown) is coupled to the Ci input port of PU(2) in row 50. Also shown in FIG. 5C are the generation of partial products PU(0)–PU(3).

It should be noted that the A operand can be set to A(n) by setting multiplexers 50 (FIG. 4) of the top row of PUs to pass the non-shifted value or can be set to A(n−1) by setting multiplexers 50 to pass the shifted A value. Alternatively, the A operand can be set to be A(n)="0" or "1" using circuitry shown in FIG. 3A. As described above, the same A operand is propagated through each column of PUs in the array.

Summarizing the above description, when performing a multiplication operation using the 4×4 array of DPUs shown in FIG. 5A, each DPU is set in the following manner:
1) all of the A input ports of each DPU are coupled in the same manner to one of the following:
   a) A(n)=A(n) by setting multiplexers 50 (top and bottom) to pass A(n);
   b) A(n)=A(n−1) by setting multiplexers 50 (top and bottom) to pass A(n−1);
   c) A(n)="0" or "1" using circuitry shown in FIG. 3A;
2) multiplexers 51 and 53 are set to pass S(n+2) to the B input port of PU(n) in the next row of PUs, except for the first row where the multiplexers 51 are set to pass B(n) of the B operand to the B input port of each PU(n) in the first row of PUs within the array;
3) multiplexers 52 and 54 are set such that PU(n) in a row of PUs receives its carryin value from the PU(n+1) carryout in the previous row of PUs, except for the first row where the PUs receive a carryin of "0" through the Cm(0)–Cm(3) inputs;
4) multiplexers 59 are set so that the sumout value is passed from the bottom row of PUs;
5) multiplexer 40 and NextC3 carry signal are in "don't care" conditions.

In operation, the A operand, B operand, and multiplexer controls are coupled to the 4×4 array of DPUs. Each row of PUs (two per DPU row) performs a 16-bit addition operation and generates partial product values (P(0), P(1), P(2), and P(3)) as well as a 16-bit sumout value and 16-bit carryout value which is coupled to the next row of PUs. The partial products are coupled to full adder 60 (FIG. 5A) which generates the lower order 16 bits of the resultant. The 16-bit sumout value and the 16-bit carryout values generated by the last row of PUs are coupled to full adder 61 (FIG. 5A) which generates the upper order 16 bits of the resultant.

In the preceding description, numerous specific details are set forth, such as specific bus widths in order to provide a thorough understanding of the present invention. It will be apparent, however, to one skilled in the art that these specific details need not be employed to practice the present invention. In other instances, well known logic structures and components have not been described in order to avoid unnecessarily obscuring the present invention.

Moreover, although the components of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recite only those features regarded as essential to the invention.

What is claimed is:

1. A datapath unit for operating on input data according to a given operation and to generate output data, said datapath unit comprising:
   a configuration of multi-function processing units interconnected into at least a row of processing units, each processing unit being controllable to perform a selected one of a plurality of operations, wherein no more than N processing units are required to perform some of the plurality of operations on first and second N-bit operands; and
   a control input, coupled to the configuration of multi-function processing units, to dynamically (re)configure at least a subset of the multi-function processing units to perform any operation from a set of operation including an arithmetic operation, a logic operation, a conditional arithmetic operation and a conditional logic operation.

2. The datapath unit as described in claim 1 wherein each processing unit performs single-bit operations on the first and second operands.

3. The datapath unit as described in claim 2 wherein said each processing unit is a modified adder including addition circuitry, carryout generation circuitry, Boolean logic circuitry, and a multiplexer, said multiplexer inputs coupled to operation resultants generated by said circuitry.

4. A datapath circuit including the datapath unit as described in claim 2 wherein said datapath unit includes a carryin input port and a carryout output port, said carryin input port being selectively coupled to said carryout output port of another datapath unit when performing said one of said plurality of operation which involves one of a logical addition operation and a logical subtraction operation so as to form a datapath circuit having an associated input operand bit width greater than a single datapath unit's input associated input operand bit width.

5. The datapath unit as described in claim 1 wherein said plurality of operations include logical addition operations, logical subtraction operations, incrementation operations, decrementation operations, conditional logical operations, and Boolean logic operations.

6. The datapath unit as described in claim 1 wherein said datapath unit is programmable to perform a multi-bit operation.

7. A datapath unit for operating on input data according to a given operation and to generate output data, said datapath unit comprising:
   a configuration of multi-function processing units interconnected into at least two rows of processing units, each processing unit being controllable to perform any of a plurality of operations from a set of operations including arithmetic operations, logic operations, conditional arithmetic operations and conditional logic operations, wherein no more than N processing units in each of the at least two rows are required to perform some of the plurality of operations on first and second N-bit operands; and
   a plurality of path selection means for determining the dataflow path into, through, and out of said configuration dependent on said selected operation.

8. The datapath unit as described in claim 7 wherein each processing unit performs single-bit operations on at least one of the first operand, the second operand, and a third operands.

9. The datapath unit as described in claim 8 wherein said each processing unit is a modified adder including addition circuitry, carryout generation circuitry, Boolean logic circuitry, and a multiplexer, said multiplexer having inputs coupled to operation resultants generated by said circuitry.

10. The datapath unit as described in claim 9 comprising a first set of multiplexers for selectively directing said input data into said configuration of modified adders, a second set for selectively directing said output data from said configuration of modified adders, a third set for selectively directing carryin data into each modified adder, a fourth multiplexer for selecting a carryout signal from said configuration of modified adders.

11. The datapath unit as described in claim 9 wherein said configuration includes two rows of four single-bit modified adders forming four stacks of two modified adders each, each stack generating a single bit of said output data, wherein said datapath unit has a 4-bit input operand bit width.

12. The datapath unit as described in claim 8 wherein said datapath unit includes a carryin input port and a carryout output port, said carryin input port being selectively coupled to said carryout output port of another datapath unit when performing said one of said plurality of operation which involves one of a logical addition operation and a logical subtraction operation so as to form a datapath circuit having an associated input operand bit width greater than a single datapath unit's associated input operand bit width.

13. The datapath unit as described in claim 9 wherein said plurality of datapath selection means are 2-to-1 multiplexers.

14. The datapath unit as described in claim 13 comprising sets of multiplexers including a first set of multiplexers, each corresponding to one of said adders and each for selectively directing input operand data into said each adder, a second set of multiplexers, each corresponding to one of said adder stacks, for selectively directing said output data from said adder stacks, a third set of multiplexers, each corresponding to one of said adders, for selectively directing carryin data into each adder, a fourth multiplexer for selecting a carryout signal from one of a top row of adders of said configuration and a bottom row of adders of said configuration dependent on fourth control signals.

15. The datapath unit as described in claim 7 wherein said plurality of operations include logical addition operations, logical subtraction operations, incrementation operations, decrementation operations, conditional logical operations, and Boolean logic operations.

16. The datapath unit as described in claim 7 wherein each of said plurality of datapath selection means comprises a multiplexer.

17. The datapath unit as described in claim 7 wherein said datapath unit is programmable to perform a multi-bit operation.

18. A datapath circuit for operating on input data according to a given operation and to generate output data, said datapath circuit comprising:
   a plurality of datapath units, each datapath unit including a configuration of multi-function processing units interconnected into at least two rows of processing units, each processing unit of a given datapath unit being controllable to perform any of a plurality of operations from a set of operations including arithmetic operations, logic operations, conditional arithmetic operations and conditional logic operations, wherein the number of processing units in each of said path units determines an associated datapath input operand bit width of said datapath units, wherein no more than 8×N processing units are required to perform the plurality of operations on first and second N-bit operands, and said datapath units each including a plurality of path selection means for determining the dataflow path into, through, and out of said configuration dependent on said selected operation;

wherein said plurality of datapath units include ports for connecting to other of said datapath units so as to form said datapath circuit having a wider input operand bit width than said associated input operand bit width; and wherein said plurality of datapath units perform the same selected operation.

19. The datapath circuit as described in claim 18 wherein said configuration of multi-function processing units includes two rows of four single bit modified adders, said configuration forming four stacks of two modified adders each, each processing unit performing a single bit addition operation, each stack generating a sum and carryout data bit, wherein ports of four rows of four adjacent datapath units are interconnected to form an array of sixteen datapath units which perform a first step of a 16×16 bit multiplication operation, and wherein additional circuitry performs a second step of said 16×16 bit multiplication operation.

20. The datapath circuit as described in claim 18 wherein each of said plurality of datapath units is programmable to perform a multi-bit operation.

21. A datapath circuit for operating on input data according to a given operation and to generate output data, said datapath circuit comprising:

a plurality of datapath units each including a configuration of multi-function processing units interconnected into at least a row of processing units, each processing unit being controllable to perform any of a plurality of operations from a set of operations including arithmetic operations, logic operations, conditional arithmetic operations and conditional logic operations, wherein the number of processing units in each of said datapath units determines an associated datapath input operand bit width of said datapath units, wherein no more than N processing units are required to perform some of the plurality of operations on first and second N-bit operands;

wherein said plurality of datapath units include ports for connection to other of said datapath units so as to form said datapath circuit having a wider input operand bit width than said associated input operand bit width; and wherein said plurality of datapath units are programmable to perform the same selected operation.

22. The datapath circuit as described in claim 21 wherein each of said plurality of datapath units is programmable to perform a multi-bit operation.

23. A configurable programmable datapath system having an associated bus width, said datapath system comprising:

an array of datapath units, each datapath unit including a configuration of multi-function processing units, each processing unit of a given datapath unit and programmable to perform any of a plurality of operations from a set of operations including arithmetic operations, logic operations, conditional arithmetic operations and conditional logic operations, wherein the number of processing units in each of said datapath units determines an associated datapath input operand bit width of said datapath units, wherein no more than N processing units are required to perform some of the plurality of operations on first and second N-bit operands;

said datapath units being interconnectable so as to form datapath circuits having an associated input operand bit width greater than said associated input operand bit width of said datapath unit;

said array being configurable into a combination of groups of interconnected datapath units; and said array being programmable to perform at least one operation by applying control signals to said individual datapath units and groups of datapath units.

24. The datapath system as described in claim 23 wherein said array has 32 rows of 8 datapath units each.

25. The configurable programmable datapath system as described in claim 23 wherein each of said plurality datapath units is programmable to perform a multi-bit operation.

26. An apparatus comprising:

a dynamically adaptive datapath unit including a plurality of multi-function processing units, selectively coupled in one or more row(s) of processing units, each processing unit being controllable to perform any of a plurality of arithmetic operations, logic operations, conditional arithmetic operations and conditional logic operations; and a control input, coupled with the dynamically adaptive datapath unit, to receive control signal(s) during operation of the apparatus to dynamically (re)configure one or more of the plurality of multi-function processing units, wherein the control signals selectively modify one or more of the functional operation of the datapath unit, the number of multi-function processing units enabled, and a bandwidth of the datapath unit.

27. An apparatus according to claim 26, wherein the control signal(s) programs the datapath unit to perform a given function.

28. An apparatus according to claim 26, wherein the control signal(s) is (are) derived from an opcode generated in the apparatus.

29. An apparatus according to claim 26, further comprising:

additional dynamically adaptive datapath units, wherein multiple dynamically adaptive datapath units are simultaneously controlled by the received control signal(s) to function together to form a datapath circuit having a greater datapath input operand than a single datapath unit.

30. An apparatus according to claim 26, wherein the dynamically configurable datapath units are selectively (re)configurable to perform any of a number of arithmetic operations, logic operations, conditional arithmetic operations, and conditional logic operations based, at least in part, on the received control signal(s).

31. An apparatus according to claim 26, wherein the apparatus is a wireless communications device, and the dynamically configurable datapath unit(s) are dynamically (re)configurable to implement any of a number of wireless modulation schemes through select implementation of one or more of arithmetic operations, logic operations, conditional arithmetic operations and conditional logic operations.

* * * * *